United States Patent
Krivka

[11] 3,930,625
[45] Jan. 6, 1976

[54] STEAM-POWERED AIRCRAFT

[76] Inventor: Alexander Krivka, P.O. Box 251, Woodland Hills, Calif. 91364

[22] Filed: Sept. 3, 1974

[21] Appl. No.: 502,271

Related U.S. Application Data

[63] Continuation-in-part of Ser. No. 399,984, Sept. 24, 1973, abandoned, which is a continuation of Ser. No. 295,179, Oct. 5, 1972, abandoned.

[52] U.S. Cl. ............. 244/17.21; 244/17.23; 416/20
[51] Int. Cl.² .................. B64C 27/08; B64C 27/16
[58] Field of Search ........... 244/17.21, 17.19, 17.23, 244/17.11, 12 R, 12 CW, 15, 6; 104/23 R, 23 FS; 415/80, 168; 416/20, 90 A; 115/42, 1 C

[56] References Cited

UNITED STATES PATENTS

| | | | |
|---|---|---|---|
| 1,344,661 | 6/1920 | Strong | 416/20 |
| 1,637,389 | 8/1927 | Peterson | 416/20 |
| 1,692,397 | 11/1928 | Wagner | 244/17.19 |
| 2,575,886 | 11/1951 | Myers | 244/6 |
| 2,659,556 | 11/1953 | Doblhoff | 416/20 X |
| 2,799,353 | 7/1957 | Andrews | 416/20 |
| 3,050,275 | 8/1962 | Kottsieper | 244/17.11 |
| 3,138,349 | 6/1964 | Piasecki | 244/17.21 |
| 3,752,418 | 8/1973 | Rosta | 244/17.19 X |

FOREIGN PATENTS OR APPLICATIONS

| | | | |
|---|---|---|---|
| 282,106 | 7/1928 | United Kingdom | 415/168 |
| 607,627 | 8/1960 | Italy | 416/20 |

Primary Examiner—Trygve M. Blix
Assistant Examiner—Barry L. Kelmachter
Attorney, Agent, or Firm—Allan M. Shapiro

[57] ABSTRACT

A steam generator on the aircraft selectively delivers high-pressure steam to atmospheric discharge jets on a lift rotor and/or to peripheral jets on a forwardly-directed propulsion propeller. The propeller is enclosed by a hollow shroud into which the steam jets discharge so that the shroud acts both as a propeller efficiency-enhancing device and a steam condenser to permit recycling of the condensate.

20 Claims, 10 Drawing Figures

Fig. 10

STEAM-POWERED AIRCRAFT

CROSS REFERENCE

This is a continuation-in-part of patent application Ser. No. 399,984, filed Sept. 24, 1973 now abandoned, which in turn was a continuation of patent application Ser. No. 295,179, filed Oct. 5, 1972, now abandoned.

BACKGROUND OF THE INVENTION

1. Field of the Invention

This invention is directed to a steam-powered aircraft having provisions for condensing that portion of the steam used for forward propulsion.

2. Description of the Prior Art

Prior to the piston-type internal combustion engine, little progress was made in aviation. The earliest powered flights were accomplished with the early development of that type of power unit. From World War I to piston power's highest point of development during World War II, power increased to about 100 horsepower per cylinder. Present day high performance aircraft employ internal combustion engines of the turbine type. Internal combustion engines have powered winged airplanes, helicopters, and autogyros. In these aircraft of the prior art, shaft power, whether by piston or turbine engines, has been employed to drive the propellers. However, in helicopters, blade-tip jets have been experimentally employed to rotate the lift rotor.

SUMMARY OF THE INVENTION

In order to aid in the understanding of this invention, it can be stated in essentially summary form that it is directed to a steam-powered aircraft. The aircraft includes a forward propulsion propeller. Steam is directable to the propeller where it is discharged from jets on the propeller blades into a shroud which forms condensation means whereby a maximum amount of the steam is condensed for reuse.

It is thus an object of this invention to provide a propulsion system for a shrouded propeller on an aircraft where power is originally produced by combustion remote from the propeller. It is another object to provide a steam-powered propulsion means for a rotary wing aircraft whereby a maximum amount of the steam is condensed so that the condensate may be used and circulated through the steam propulsion system. It is another object to provide a steam-powered rotary wing aircraft which has both a lift rotor and a forward thrust propeller, with power being selectively deliverable to the lift rotor for vertical aircraft flight and to the forward thrust propeller for forward flight. It is yet another object to provide a shroud around the forward thrust propeller of such an aircraft, with the steam jets in the forward thrust propeller being directed into the shroud so that the shroud acts as a condensation means.

The features of the present invention which are believed to be novel are set forth with particularity in the appended claims. The present invention, both as to its organization and manner of operation, together with the further objects and advantages thereof, may be best understood by reference to the following description, taken in conjunction with the accompanying drawings.

DESCRIPTION OF THE PREFERRED EMBODIMENT

Figure 1:
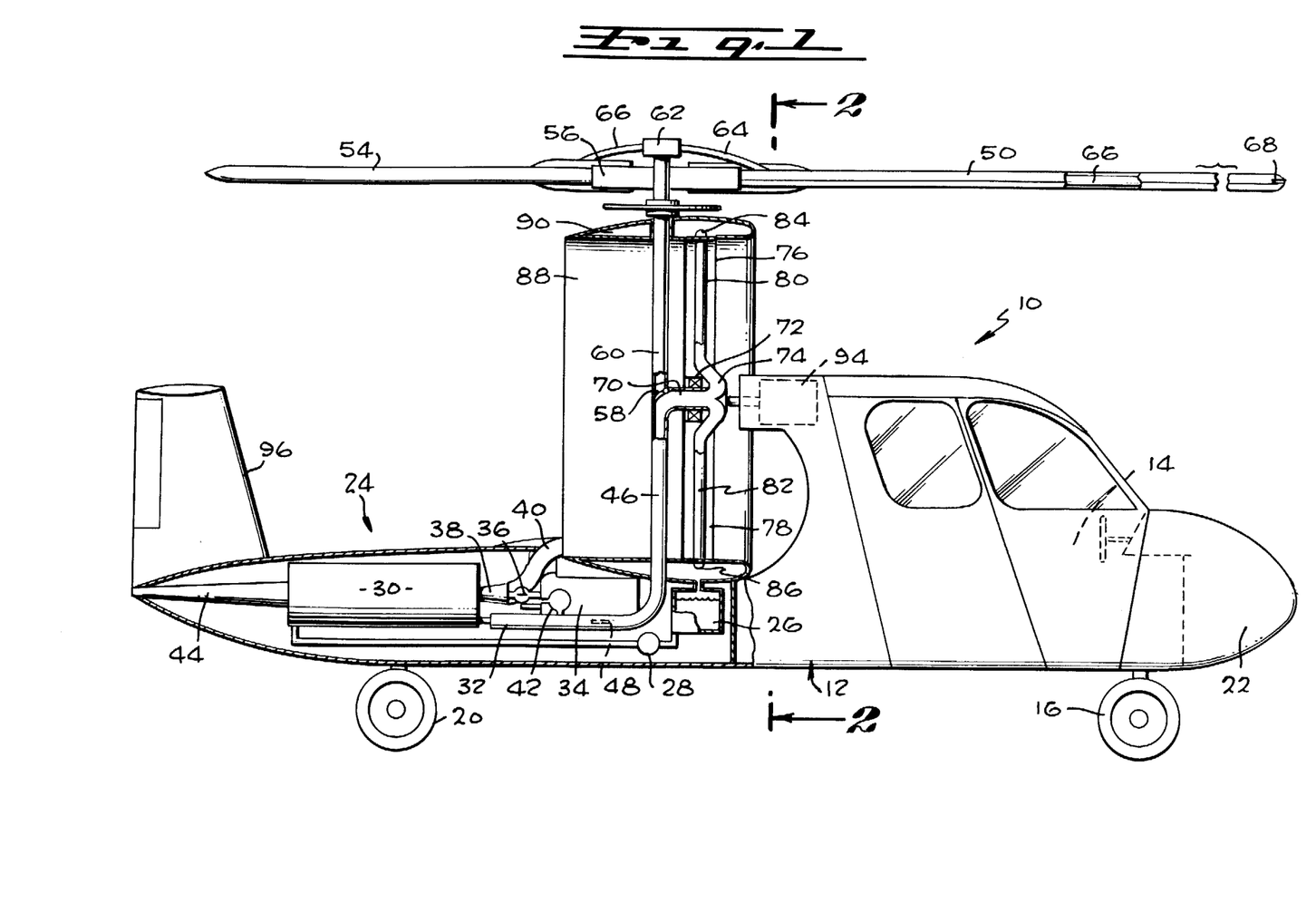
FIG. 1 is a side-elevational view, with parts broken away and parts taken in section, of a preferred embodiment of the steam-powered aircraft of this invention.

FIG. 1 illustrates the steam-powered aircraft 10 of this invention in side elevation, with parts of the near side broken away so that internal elements can be seen, and parts taken in section so that details are visible. Aircraft 10 has a fuselage 12 which includes a conventional pilot's cockpit 14 to be occupied by a pilot for the control of the aircraft. of course, the cockpit may be sufficiently large to permit the aircraft to carry one or more passengers. Many present-day rotary wing aircraft employ pontoons or skids rather than wheels for their support on the ground. Thus, aircraft 10 may have such pontoons or skids, although wheels, as indicated at 16, 18, and 20, are preferable in the instant case. If desired, nosewheel 16 can retract into forward compartment 22 when in flight. similar provisions can be provided for the main rear wheels 18 and 20, if desired, but their broad treadwidth makes it more difficult to obtain retraction.

Motive power is produced by steam-generating equipment 24. Water is supplied from feedwater tank 26 to feedpump 28 to boiler 30. Feedpump 28 is regulated in accordance with steam rate. Boiler 30 can be any conventional high-performance boiler including but not limited to forced circulation boilers and once-through boilers. Preferably, it is a boiler which can be highly forced to obtain a high steam rate for a short period and yet have reasonable efficiency at normal steam rates. Steam generated in boiler 30 is delivered through steam main 32.

For combustion, pressurized fuel is delivered from fuel tank 34 through fuel rate control valve 36 to burner 38 which supplies its products of combustion to boiler 30. Forced draft is provided through air duct 40 to the burner, and fuel rate control valve 36 is controlled, at least in part, by means of control line 42 which signals the steam pressure in steam main 32.

Exhaust of the products of combustion from boiler 30 passes out rearwardly-directed duct 44.

Figures 3, 4:
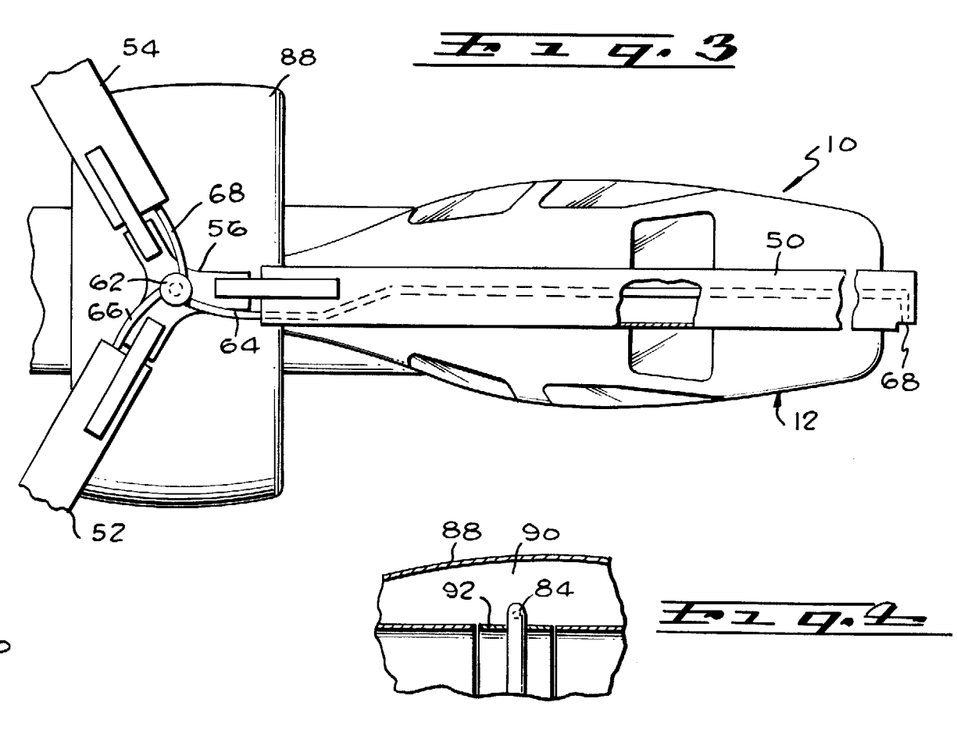
FIG. 3 is a plan view of the aircraft, with parts broken away.
FIG. 4 is an enlarged section, with parts broken away, through a portion of the horizontal propulsion propeller.

Main steam standpipe 46 extends upwardly out of the fuselage behind the cockpit. Steam delivery to standpipe 46 is controlled by throttle valve 48, which is controlled by the pilot. Throttle valve 48 is one of the ways the pilot has of controlling power to the lift and propulsion equipment of the aircraft. Standpipe 46 is also a mast which carries conventional type lift rotor blades on the top thereof. FIG. 3 illustrates lift rotor blades 50, 52, and 54. These blades are mounted on a hub 56, the entire structure being of conventional design so that the blades can be controlled to provide directional capability, as well as lift upon rotation thereof.

Standpipe 46 is provided with gate valve 58 which, when open, permits steam flow upwardly to the upper portion 60 of the combined mast and steam standpipe. The upper end of the standpipe terminates in distributor 62 from which three flexible hoses 64, 66, and 68 respectively deliver steam to the three lift rotor blades 50, 52 and 54. The steam pipe extends to the tip of each blade, see steampipe 64 in blade 50 in FIGS. 1 and 3. The outer ends terminate in circumferentially-directed jets, for example jet 68 in rotor 50, illustrated in FIGS. 1 and 3. Blades 52 and 54 have similar jets, each directed to rotate lift rotor blades in the counterclockwise direction, as seen from the top of the aircraft.

Figure 2:
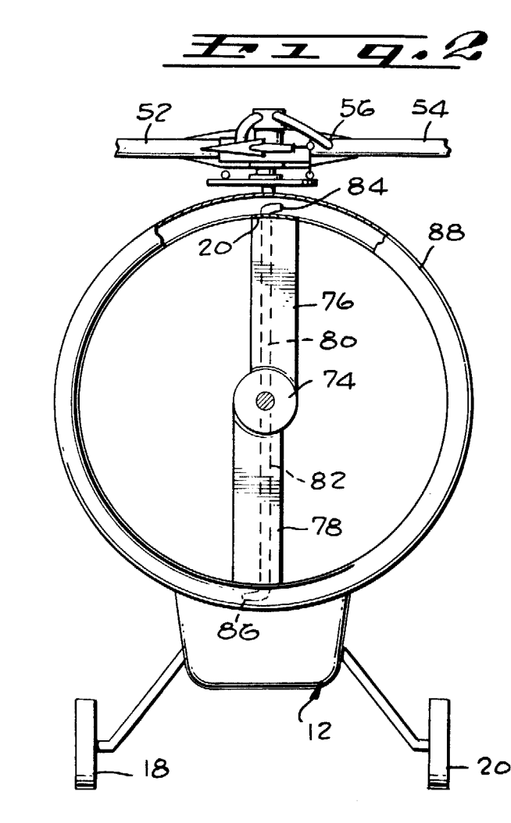
FIG. 2 is a vertical section taken generally along the line 2—2 of FIG. 1.

Forward from gate valve 58 is duct 70 which passes through rotating joint 72 to distributor hub 74. Distributor hub 74 is the hub of a propeller which has blades 76 and 78. Steampipes 80 and 82 extend outwardly through propeller blades 76 and 78, respectively, and terminate at the outer ends of the blades in circumferentially-directed jet nozzles 84 and 86. Thus, delivery of steam through distributor hub 74 causes counterclockwise rotation of the propeller, as seen in FIG. 2.

Annular shroud 88 encloses the tips of propeller blades 76 and 78. Shroud 88 may be of conventional aerodynamic design to enhance the propeller efficiency by reducing the tip losses. However, additionally, shroud 88 is a hollow annulus into which the jet nozzles 84 and 86 discharge. Thus, shroud 88 acts as a condenser with the steam vapor condensing in the annular space 90 therein. Shroud 88 is constructed with a thin metallic skin for heat exchange with the passing air to condense the steam in shroud 88. As is seen in FIG. 4, shroud ring 92 is mounted on the end of the propeller blades to substantially close the annular slot into the interior annular space of the shroud to minimize steam losses. As is seen in FIG. 1, condensed liquid gravitationally is discharged from the interior annular space 90 into feedwater tank 26. Electric generator 94 is mounted in the upper rear of the cockpit portion of the fuselage and is connected to be driven by rotation of the forward thrust propeller. In this position, it also serves as an additional mechanical support for the propeller axis and rotor mast. Generator 94 provides power for the electrical needs of aircraft 10.

Gate valve 58 can be controlled to open communication from steam standpipe 46 to the upper portion 60 of the standpipe for delivery of steam to the lift rotor blade tip jet, or it can be positioned to direct steam to the lift rotor blade tip jet, or it can be positioned to direct steam through duct 70 to the propeller blade-trip jets, or it can be positioned to permit steam to pass to both sets of these jets. Under these circumstances, the pilot of aircraft 10 has three choices of taking off. In the first case, he positions gate valve 58 to close duct 70 to direct all steam up standpipe 46 through the upper portion 60 thereof to the lift rotor blade tip jets. This causes rotation of the lift rotor blades with consequent vertical liftoff of aircraft 10. The rotor blades are controlled in conventional helicopter blade control manner so that pitch and roll control of the aircraft can be accomplished during the liftoff maneuver. The amount of power delivered for liftoff is controlled by the pilot by control of throttle valve 48. When vertical liftoff is accomplished and forward motion is desired, the pilot controls the lift rotor blades for forward aircraft motion and he moves the gate valve 58 to an intermediate position where some steam is also delivered through duct 70 to the tip jets of the propeller blades. It is probably in this flight mode where maximum steam demand is required. Thus, the forced capacity of boiler 30 is designed for this requirement. However, the design of the various jets, blades, ducts, and valves can provide a tradeoff in characteristics between demanded maximum power and efficiency at cruising power. In any event, in this condition, the propeller blades 76 and 78 provide forward thrust so that the aircraft 10 moves forward. As forward speed increases, the lift rotor blades are placed in an auto-rotating lift attitude, and valve 58 is positioned to cut off steam flow to the upper portion 60 of the standpipe so that now the lift rotor blades are providing lift through auto-rotation. Since fluid loss is occasioned by operation of the lift rotor blade tip jets, shutoff of steam to duct 60 as early as possible reduces the loss of system fluid. When the desired forward speed of the aircraft is reached, the throttle valve 48 is controlled to limit speed. In this type of forward flight, all of the steam passes out of the propeller blade type jets and into the condenser space 90 in shroud 88. Thus, there is little loss of the steam fluid, and most is returned to circulation.

As is conventional in normal steam engine practice, when normal long-term flight is achieved, it may be desirable to leave the throttle valve 48 full open and control the steam pressure, rather than cause throttling whereby the power to the propeller is controlled. In this way, throttling losses are eliminated.

Water is described as the preferred fluid medium for the steam cysle. One reason for the desirability of water, in addition to its well-studied characteristics in boiler operation, is that a certain amount of the system fluid will be lost through the lift rotor blade tip jets when steam is delivered to them. Water has no undesirable affect on the atmosphere, thus is a safe fluid. However, other fluids are conceivable, particularly when the aircraft is rarely operated in modes where the tip jets are employed.

Another takeoff mode is available by initially directing steam to both the lift rotors and the forward propeller. Now the aircraft 10 has power to both lift and forward motion so that it operates in a short takeoff mode. Once airborne and having sufficient forward velocity, the lift rotor is returned to auto-rotating position, and gate valve 58 is directed so that all steam passes to the forward thrust propeller. In the first described mode of takeoff, wheels are not necessary, but it is clear that, since this takeoff mode includes forward motion on the ground, wheels are required.

In a final takeoff mode, valve 58 is positioned so that all steam is directed to the forward thrust propeller and the lift rotor blades are positioned for auto-rotative lift. Now, with opening of the throttle valve 48, the forward motion of the aircraft 10 along the runway causes autorotation of the lift rotors, and this in turn causes lift so that the aircraft takes off by forward motion causing lift. The lift rotor blades are controllable so that pitch and roll stability of the aircraft is accomplished by lift rotor blade manipulation. However, direction of the aircraft is accomplished by tail rudder 96, of conventional design.

FIGS. 5 through 8 show another preferred embodiment of a steam motive power system for the aircraft. Steam generator 102 supplies steam to high pressure chamber 104. There are two outlet steam passages 106 and 108 from which steam is discharged from chamber 104, and flow through the two passages is respectively controlled by throttle valves 110 and 112. Steam passages 106 and 108 are independent of central shaft 114. Front and rear propellers 116 and 118 are respectively mounted on bearings 120 and 122, which each contain a rotating steam joint by which the steam from passages 106 and 108 can respectively pass into the rotating hubs of the front and rear propellers. The outer propeller tips include steam jets 124 and 126, respectively, which operate in shroud 128 to drive the propellers in contra-rotating directions. The blades and the propellers are preferably of variable pitch so that they can be feathered as required.

Figures 5, 6, 7, 8:
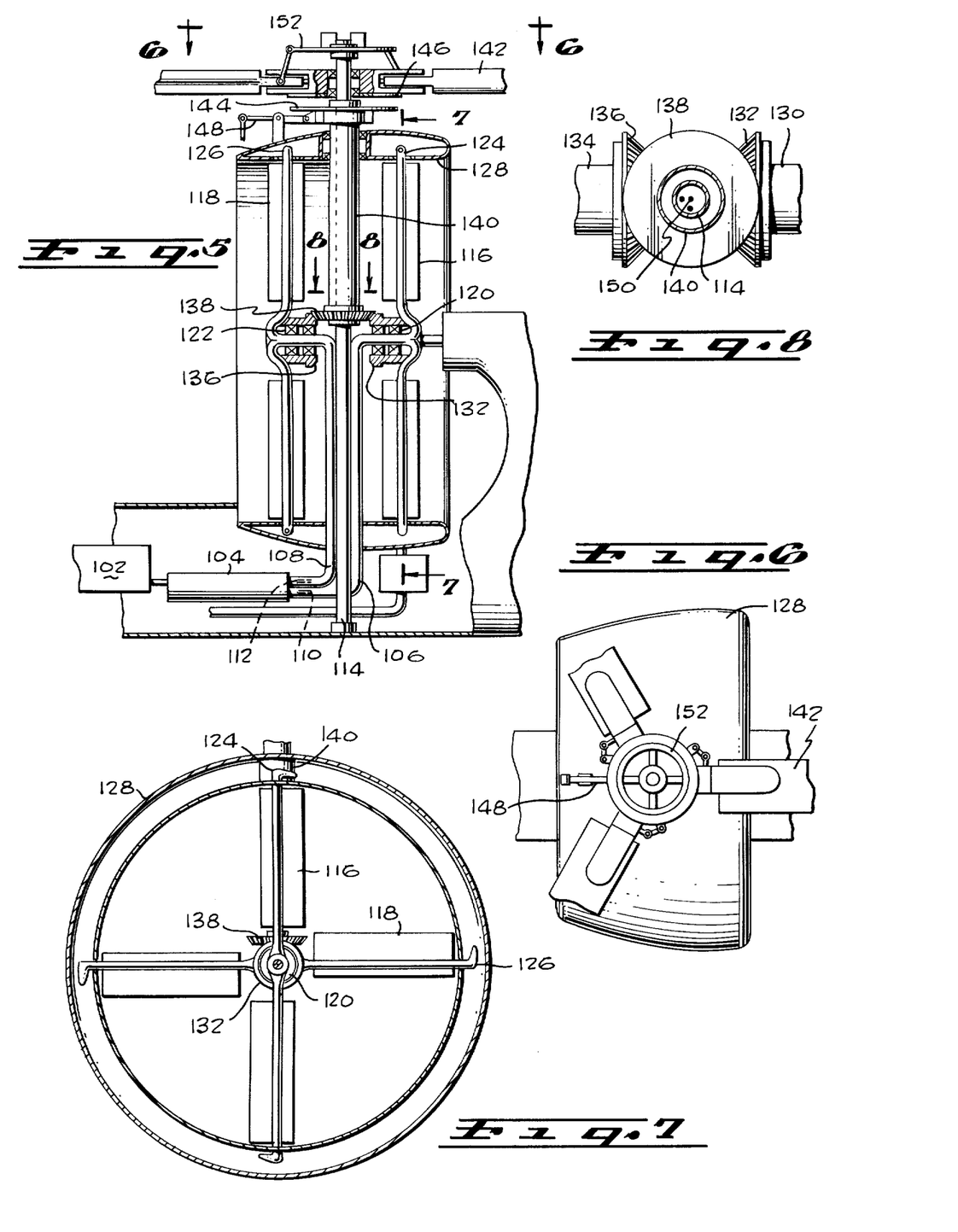
FIG. 5 is a vertical section along the longitudinal axis of the aircraft showing another preferred embodiment of the forward thrust and lift structure.
FIG. 6 is a plan view taken generally along the line 6—6 of FIG. 5 showing the top view of the forward thrust shroud and showing the lift blades partially broken away.
FIG. 7 is a vertical section taken generally long the line 7—7 of FIG. 5.
FIG. 8 is an enlarged horizontal section taken generally along the line 8—8 of FIG. 5.

Hub 130, see FIG. 8, of forward propeller 116 carries gear 132. Similarly, hub 134 of propeller 118 carries gear 136. These gears mate with gear 138, which is fixed to the shaft 140. Shaft 140 engages around central shaft 114. Shaft 140 powers lift rotor engageable against clutch disc 146 by operation of linkage 148. Clutch disc 144 is arranged so that it can move along shaft 144, as on splines, so that, when it is raised, it engages with clutch disc 146 to rotate lift rotor 142. Thus, the lift rotor can be selectively operated. Control rods 150 are seen in the center of central shaft 114 in FIG. 8. These control rods operate the individual lift rotor blades through swash plate 152, as in conventional helicopter practice, for longitudinal, lateral and vertical control. Feathering of the propellers 116 and 118 provides for ground spin-up of the lift rotor. The clutch is then disengaged and the pitch on the lift rotor is adjusted to provide lift thrust with clutch 144 disengaged. Rotation of the lift rotor is then with tip jets as in FIG. 1. Of course, with clutch 144 disengaged, the forward thrust is available from both of the propellers. A particular advantage of this embodiment is that steam discharge is confined into the shroud where it is condensed and returned, even in rotor spin-up operations. Thus, the steam-driven rotation of the propellers provides all of the shaft power necessary for the lift blades for ground spin-up. No net torque is developed on the rotor axis so no tail rotor is necessary.

Figure 9:
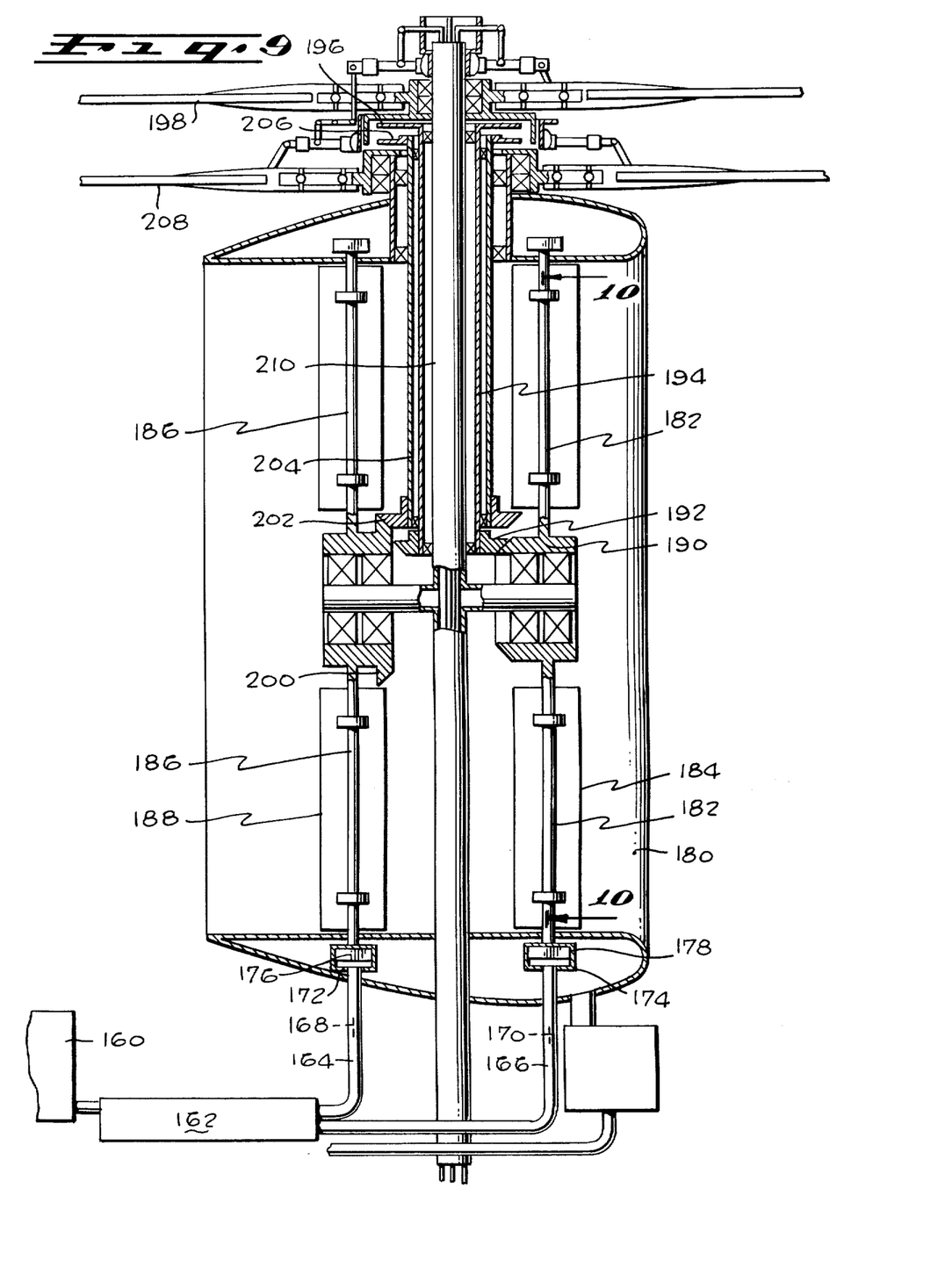
FIG. 9 is a vertical section through another preferred embodiment of the forward thrust structure and of the vertical lift structure.
Figure 10:
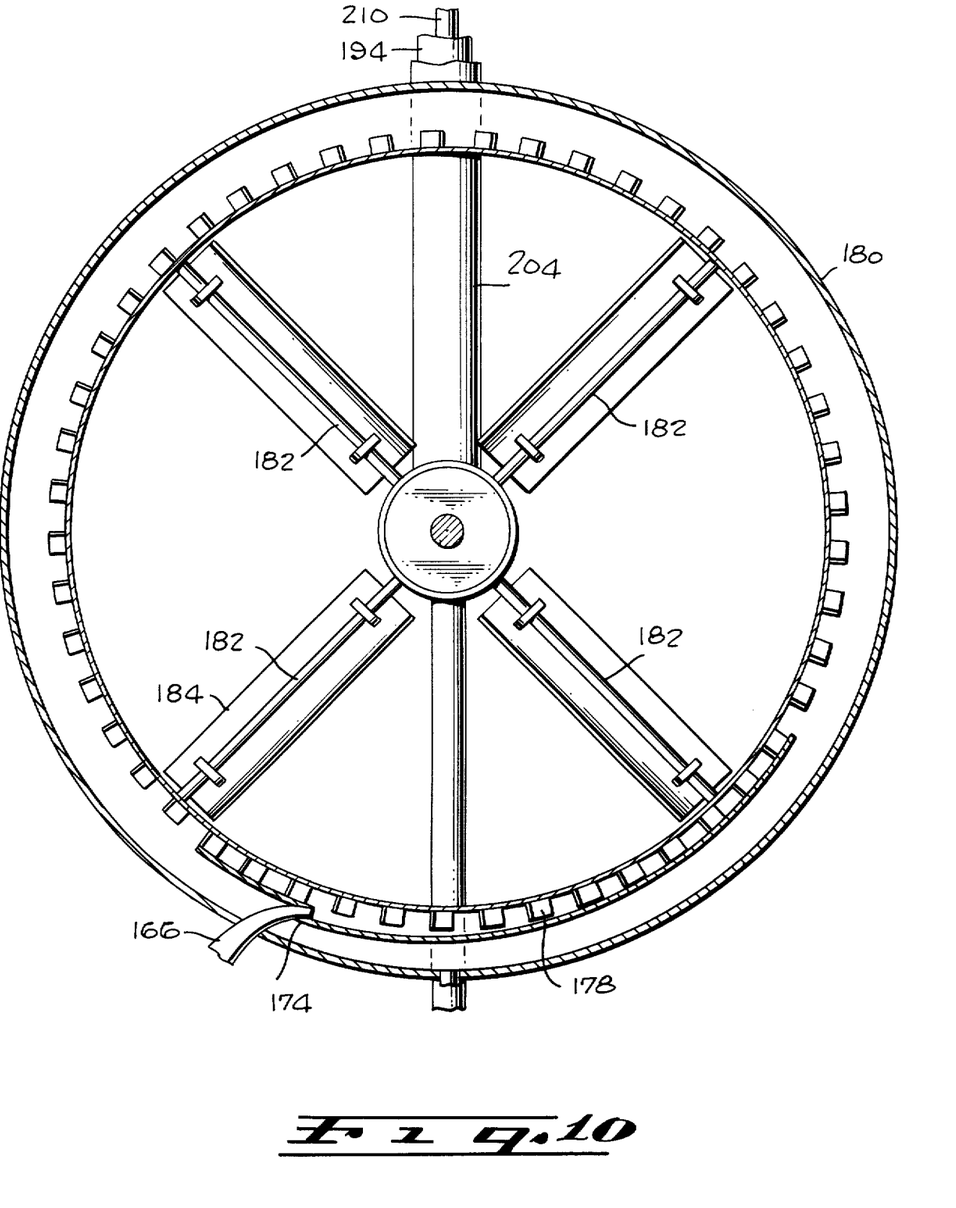
FIG. 10 is a section taken generally along the line 10—10 of FIG. 9.

FIGS. 9 and 10 illustrate a further preferred embodiment of steam power means for powering an aircraft. In FIG. 9, boiler 160 supplies high pressure steam through chamber 162 to high pressure steam lines 164 and 166. These steam lines have individual throttles 168 and 170 to control the steam flow to nozzle boxes 172 and 174. These nozzle boxes have steam nozzles for directing steam to impulse buckets 176 and 178 on turbine wheels. These turbine wheels consist of rims rotating in shroud 180 and respectively carried on the four propeller blade supports of each propeller. The four supports 182 of the forward propeller 184 are shown in FIGS. 9 and 10, while two of the similar supports 186 of rear propeller 188 are shown in FIG. 9. These radial supports hold the bucket wheels in place to close the ring slots on the inner side of the shroud to substantially close the shroud for condenser purposes and carry thee turbine buckets or impulse blades. An impulse turbine structure is preferred in this environment because of the single-stage operation. If desired, a plurality of rows of blades can be arranged on the bucket wheel, associated with suitable stator blades, for increased steam efficiency, if desired. By control of the throttles and by individual control of the pitches of the blades of each of the forward and rear propellers, the speed of the propellers is controlled.

Gear 190 on the forward propeller mates with gear 192 which is secured to upper drive shaft 194. Upper drive shaft 194 carries upper clutch disc 196 which is engageable with a facing clutch disc which, in turn, drives upper lift rotor 198. Similarly, the hub of the rear propeller carries gear 200 which mates with gear 202 on lower drive shaft 204. Lower drive shaft 204 carries lower clutch disc 206 which faces the companion clutch disc on lower lift rotor 208. Each of the clutches is individually engageable, and each of the rotors has blades which couple individually controllable so that vertical, longitudinal and transverse motions are achieved by rotor blade control. The control rods for controlling the blades are located in inner shaft 210. This shaft also serves as a mast which supports the entire structure. By individual control of the blades of the upper and lower rotors and by individual control of the amount of power delivered thereto by control of the amount of steam and pitch of the forward and rear propellers, the torque of the aircraft about the mast can be controlled. Thus, the whole aircraft can be rotated about the mast axis or held stationary by the relative torque applied to the two lift rotors so that no tail rotor is necessary.

Pure lift can be accomplished by feathering the forward and rear propeller blades and transmitting all of the power to the lift rotors through the engaged clutches. Forward motion in addition to that achieved by control of the lift rotors can be achieved by applying pitch to the forward and rear propellers so that power is delivered to both the forward and lift thrust-producing devices at the same time for short landing and take-off capability. Finally, in the full flight mode, the clutches can be disengaged and the front and rear propellers turned to an appropriate full speed pitch so that lift is obtained by auto-rotation of the lift rotors, and forward speed is accomplished by proper pitch of the forward thrust propellers. Thus, all operational modes are accomplished with this structure. Efficiency is achieved because no steam is discharged to the atmosphere, and high efficiency turbine structures are used to rotate the forward and rear propellers. Of course, a maximum amount of steam is condensed for reuse so that the aircraft has a proper range.

Of course, the propulsion system disclosed herein is useful for the propulsion of other vehicles for land, sea or air.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A vehicle comprising:
a fuselage, steam-generating means on said fuselage for generating steam under pressure on said fuselage;
a forwardly-directable propeller comprised of a plurality of propeller blades rotatably mounted on said fuselage, a substantially circumferentially-directed jet positioned substantially on the tip of one of said propeller blades, a pipe connected between said steam-generating means and said propeller tip jet for delivering steam under pressure to said propeller tip jet to cause rotation of said propeller;
a shroud positioned around the path of said propeller tip jet, said shroud having an annular space therein, and said propeller tip jet extending into said annular space so that steam discharged from said propeller tip jet is discharged into the annular space in said shroud so that steam is condensed within said shroud.

2. The vehicle of claim 1 wherein there is
an annular slot on the interior wall of said shroud said slot extending into the annular space in said shroud, said propeller tip jet extending through said annular slot into said annular space, a shroud ring positioned in said annular slot to substantially close said annular slot to limit the escape of steam from the annular space in said shroud.

3. The vehicle of claim 2 wherein there
are a plurality of propeller blades on said propeller, and each of said propeller blades carries a substantially circumferentially-directed jet adjacent the tip thereof and positioned within the annular space in said shroud, said shroud ring being attached to each of said blades adjacent the tip thereof and rotating with said blades.

4. The vehicle of claim 3 wherein
said blades are mounted on a rotating hub, and said hub contains a rotating steam joint for supply of steam from said steam generator means to said propeller blade tip jets.

5. The vehicle of claim 1 wherein
said propeller blades are mounted for rotation about a substantially forwardly-directed fixed axis and further comprising:
a plurality of lift rotor blades mounted for rotation about an upright axis so that, as said lift rotor blades rotate about said upright axis, lift is produced which acts upon said fuselage.

6. The vehicle of claim 5 wherein
said lift rotor blades each have a substantially circumferentially-directed jet adjacent the tip thereof, and conduit means is connected between said steam generator means and said lift rotor blade tip jet so that steam can be discharged from said lift rotor blade tip jets to cause rotation of said lift rotor blades to produce lift on said fuselage.

7. The vehicle of claim 6 wherein
an upright mast is carried on said fuselage, said lift rotor blades rotating adjacent the upper end of said mast, said mast being hollow and having a steam conduit therethrough, a distributor at the upper end of said mast, said distributor distributing steam to said lift rotor blades for discharge from the tip jets thereon to cause rotation of said lift rotor for producing lift.

8. The vehicle of claim 7 wherein
a valve is connected to shut off steam flow to the said lift rotor blades so that, during normal motion of said vehicle, all steam produced by said steam generator means is discharged through said propeller blade tip jets for recondensation and recirculation.

9. The vehicle of claim 4 wherein
said propeller blades are mounted for rotation about a substantially forwardly-directed fixed axis and further comprising:
a plurality of lift rotor blades mounted for rotation about an upright axis so that, as said lift rotor blades rotate about said upright axis, lift is produced which acts upon said fuselage.

10. The vehicle of claim 9 wherein
said lift rotor blades each have a substantially circumferentially-directed jet adjacent the tip thereof, and conduit means is connected between said steam generator means and said lift rotor blade tip jet so that steam can be discharged from said lift rotor blade tip jets to cause rotation of said lift rotor blades to produce lift on said fuselage.

11. The vehicle of claim 10 wherein
an upright mast is carried on said fuselage, said lift rotor blades rotating adjacent the upper end of said mast, said mast being hollow and having a steam conduit therethrough, a distributor at the upper end of said mast, said distributor distributing steam to said lift rotor blades for discharge from the tip jets thereon to cause rotation of said lift rotor for producing lift.

12. The vehicle of claim 11 wherein
a valve is connected to shut off steam flow to the said lift rotor blades so that, during normal motion of said vehicle, all steam produced by said steam generator means is discharged through said propeller blade tip jets for recondensation and recirculation.

13. A vehicle comprising:
a fuselage, steam-generating means on said fuselage for generating steam under pressure on said fuselage;
a forwardly directed propeller comprised of a plurality of propeller blades rotatable mounted on said fuselage on a substantially forwardly directed horizontal axis;
a lift rotor comprised of a plurality of rotor blades rotatably mounted on a substantially upwardly directed vertical axis on said fuselage
propulsion means connected to said steam-generating means for selectively rotating both said forwardly directed propeller and said lift rotor so that said vehicle can selectively be furnished with lifting force for lifting said vehicle and forward thrust for forwardly propelling said vehicle from said steam-generating means.
a condenser shroud surrounding said forwardly directed propeller for condensing steam employed in the rotation of said forwardly directed propeller.

14. The vehicle of claim 13 wherein steam
force-producing means is secured to the outer ends of said forwardly directed propeller and within said shroud for producing torque of said forwardly directed propeller by steam action on said steam thrustproducing means and steam acting therewith is discharged into said shroud to condense in said shroud.

15. The vehicle of claim 14 wherein mechanincal
connection means is interconnected between said forwardly directed propeller and said lift rotor for rotating said lift rotor from torque produced by said forward directed propeller.

16. The vehicle of claim 15 wherein a clutch is positioned in said mechanical connection means so that torque from said forwardly directed propeller can be clutched and declutched to said lift rotor.

17. The vehicle of claim 16 wherein there are two contra-rotating, forwardly directed propellers, each of said propellers receiving torque from interaction between said propellers and discharging steam within a shroud.

18. The vehicle of claim 17 wherein both of said forwardly directed propellers are selectively connectable to said rotor.

19. The vehicle of claim 17 wherein there are two lift rotors and each of said forwardly directed propellers is separately connected through a clutch to drive one of said lift rotors.

20. The vehicle of claim 19 wherein said forwardly directed propellers include blades which are featherable.

* * * * *